United States Patent
Ukai et al.

(10) Patent No.: US 8,071,060 B2
(45) Date of Patent: Dec. 6, 2011

(54) FLUE GAS CONTROL SYSTEM OF COAL COMBUSTION BOILER AND OPERATING METHOD THEREOF

(75) Inventors: Nobuyuki Ukai, Hiroshima (JP); Shintaro Honjo, Hiroshima (JP); Susumu Okino, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/812,866

(22) PCT Filed: Jan. 20, 2009

(86) PCT No.: PCT/JP2009/050771
§ 371 (c)(1), (2), (4) Date: Jul. 14, 2010

(87) PCT Pub. No.: WO2009/093576
PCT Pub. Date: Jul. 30, 2009

(65) Prior Publication Data
US 2011/0044872 A1   Feb. 24, 2011

(30) Foreign Application Priority Data
Jan. 21, 2008   (JP) ................. 2008-010331

(51) Int. Cl.
*B01D 53/34* (2006.01)
*B01D 53/50* (2006.01)
*B01D 53/56* (2006.01)
*B01D 53/64* (2006.01)
*B01D 53/74* (2006.01)

(52) U.S. Cl. ............... 423/210; 423/235; 423/239.1; 423/215.5; 423/243.08; 422/168; 422/169; 422/170; 422/172; 422/177

(58) Field of Classification Search .......... 423/235, 423/239.1, 215.5, 243.08, 210; 422/168, 422/169, 170, 172, 177
See application file for complete search history.

(56) References Cited

U.S. PATENT DOCUMENTS
6,638,485 B1   10/2003   Iida et al.
(Continued)

FOREIGN PATENT DOCUMENTS
EP   1106237 A1   6/2001
(Continued)

OTHER PUBLICATIONS
International Search Report of PCT/JP2009/050771, Mailing Date of Apr. 21, 2009.
(Continued)

*Primary Examiner* — Timothy Vanoy
(74) *Attorney, Agent, or Firm* — Westerman, Hattori, Daniels & Adrian, LLP

(57) ABSTRACT

A flue gas control system of a coal combustion boiler comprises an HCl atomizer that sprays hydrogen chloride to flue gas from a coal combustion boiler that uses coal as a fuel; $NO_x$ removing apparatus that removes nitrogen oxides by ammonia denitration by adding ammonia to the flue gas after spraying hydrogen chloride and oxidizes mercury; an air preheater that recovers heat in the gas after removal of nitrogen oxides; a precipitator that removes particulates in the gas; an activated carbon atomizer that sprays activated carbon into the gas after particulate collection; a bag filter that collects activated carbon having adsorbed mercury; a desulfurizer that removes sulfur oxides in the flue gas after removal of activated carbon; a stack that discharges the gas which has undergone desulfurization to outside; and an ORP meter that measures an oxidation reduction potential for feeding air to a slurry absorbent in the desulfurizer.

5 Claims, 6 Drawing Sheets

U.S. PATENT DOCUMENTS

| | | |
|---|---|---|
| 7,514,052 B2 | 4/2009 | Lissianski et al. |
| 7,572,420 B2 | 8/2009 | Honjo et al. |
| 2004/0202596 A1 | 10/2004 | Honjo et al. |
| 2010/0074817 A1* | 3/2010 | Kobayashi et al. ........ 423/239.1 |

FOREIGN PATENT DOCUMENTS

| | | |
|---|---|---|
| EP | 1129997 A2 | 9/2001 |
| EP | 1134195 A2 | 9/2001 |
| JP | 08-243341 A | 9/1996 |
| JP | 10-230137 A | 9/1998 |
| JP | 2001-062247 A | 3/2001 |
| JP | 2004-313833 A | 11/2004 |
| JP | 2005-059005 A | 3/2005 |
| JP | 2005-230810 A | 9/2005 |
| JP | 2006-263513 A | 10/2006 |
| JP | 2007-007612 A | 1/2007 |

OTHER PUBLICATIONS

Japanese Office Action date Mar. 15, 2011, issued in corresponding Japanese Patent Application No. 2008-010331.

* cited by examiner

US 8,071,060 B2

FLUE GAS CONTROL SYSTEM OF COAL COMBUSTION BOILER AND OPERATING METHOD THEREOF

TECHNICAL FIELD

The present invention relates to a flue gas control system of a coal combustion boiler that removes mercury from flue gas from a boiler and an operating method thereof.

BACKGROUND ART

Because mercury having high toxicity is included in flue gas discharged from a boiler, which is a combustion device in a thermal power plant or the like, conventionally, various systems for removing mercury in the flue gas have been studied.

Normally, a wet type desulfurizer for removing sulfur contents in flue gas is provided in boilers. In flue-gas treating facilities where a desulfurizer is attached to a boiler as flue-gas treating device, it is widely known that when chlorine contents (Cl) in the flue gas increase, the percentage of divalent metallic mercury soluble in water increases, and thus the desulfurizer can easily collect mercury.

Therefore, recently, various methods and apparatuses for treating metallic mercury have been devised by combining $NO_x$ removing apparatus that reduces $NO_x$ and a wet type desulfurizer that uses an alkaline absorbent as an $SO_x$ absorbent (Patent Document 1).

As a method for treating metallic mercury in flue gas, a removal method using an adsorbent such as activated carbon or a selenium filter has been known. However, this method requires a special adsorption removal unit, and thus it is not suitable for treatment of large-capacity flue gas such as flue gas from a power plant (Patent Document 2).

FIG. 7 is a schematic configuration diagram of a flue gas control system of a coal combustion boiler.

As shown in FIG. 7, a conventional flue gas control system includes $NO_x$ removing apparatus 13 that removes nitrogen oxides in flue gas from a coal combustion boiler 11 by addition of ammonia 12, an air preheater 14 that recovers heat in the gas after removal of nitrogen oxides, a precipitator 15 that removes particulates in the gas after heat recovery, a gas-liquid contact type desulfurizer 16 that removes sulfur oxides in the gas after particulate collection by a limestone gypsum method and also removes mercury oxides, and a stack 17 that discharges purged gas which has undergone desulfurization and mercury removal to outside. Further, in the conventional flue gas control system, a bag filter 21 is installed on a downstream side of the precipitator 15, to supply activated carbon 22a from an activated carbon atomizer 22 into a gas passage, so that mercury in the gas is adsorbed and removed. In FIG. 7, reference numeral 18 denotes air. By feeding the air 18, an oxidation reduction potential in the desulfurizer 16 is adjusted.

Patent Document 1: Japanese Patent Application Laid-open No. 2007-7612
Patent Document 2: Japanese Patent Application Laid-open No. 2005-230810

DISCLOSURE OF INVENTION

Problem to be Solved by the Invention

When an activated carbon adsorption method is used for removing mercury, there is a problem that the cost of facilities required for the activated carbon atomizer and the bag filter for collecting activated carbon is large, and the cost of a powdery activated carbon to be sprayed is large.

For example, if the cost of the activated carbon atomizer to be installed for mercury removal is compared with operating costs thereof for ten years, it can be more expensive than purchasing emission credits of mercury.

This is because although the activated carbon which has adsorbed mercury is separated by the bag filter, a disposal fee thereof is expensive.

Therefore, as for a measure for removing mercury in flue gas by the activated carbon adsorption method, reduction of operating costs has been desired.

In view of the above problem, an object of the present invention to provide a flue gas control system of a coal combustion boiler that can remove mercury in flue gas from the coal combustion boiler efficiently and can reduce operating costs, and an operating method thereof.

Means for Solving Problem

According to an aspect of the present invention, a flue gas control system of a coal combustion boiler includes: $NO_x$ removing apparatus that removes nitrogen oxides in flue gas from a coal combustion boiler; an air preheater that recovers heat in gas after removal of nitrogen oxides; a precipitator that removes particulates in gas after heat recovery; a gas-liquid contact type desulfurizer that removes sulfur oxides in gas after particulate collection by a limestone gypsum method and also removes mercury oxides; and a stack that discharges gas which has undergone desulfurization to outside. Hydrogen chloride is sprayed on an upstream side of the desulfurizer, and activated carbon is sprayed on a downstream side of the precipitator to adsorb mercury in gas.

According to another aspect of the present invention, a flue gas control system of a coal combustion boiler includes: $NO_x$ removing apparatus that removes nitrogen oxides in flue gas from a coal combustion boiler; an air preheater that recovers heat in gas after removal of nitrogen oxides; a precipitator that removes particulates in gas after heat recovery; a gas-liquid contact type desulfurizer that removes sulfur oxides in gas after particulate collection by a limestone gypsum method and also removes mercury oxides; and a stack that discharges gas which has undergone desulfurization to outside. Hydrogen chloride is sprayed on an upstream side of the desulfurizer, activated carbon is sprayed on a downstream side of the precipitator to adsorb mercury in gas, and an oxidation reduction potential of an absorbent in the desulfurizer is set to equal to or higher than 150 millivolts.

Advantageously, in the flue gas control system of a coal combustion boiler, a slurry absorbent containing mercury is extracted to outside, and a flocculant is added thereto before separating gypsum to flocculate and remove the mercury.

Advantageously, in the flue gas control system of a coal combustion boiler, a separate liquid in which gypsum is separated is brought into contact with at least one of activated carbon, a chelating resin, an ion exchange resin, and a sulfide-supporting carrier to adsorb and remove mercury.

According to still another aspect of the present invention, in an operating method of a flue gas control system of a coal combustion boiler, the flue gas control system of a coal combustion boiler described above is used, and when a molar ratio of mercury (Hg)/sulfur (S) in coal is equal to or higher than $1.3 \times 10^{-6}$, mercury concentration is monitored on a downstream side of a desulfurizer, and activated carbon is sprayed according to a monitoring result.

Effect of the Invention

According to the present invention, operating costs can be reduced even when activated carbon is sprayed, and adsorption and immobilization of mercury can be performed stably over a long period of time.

Figure 1:
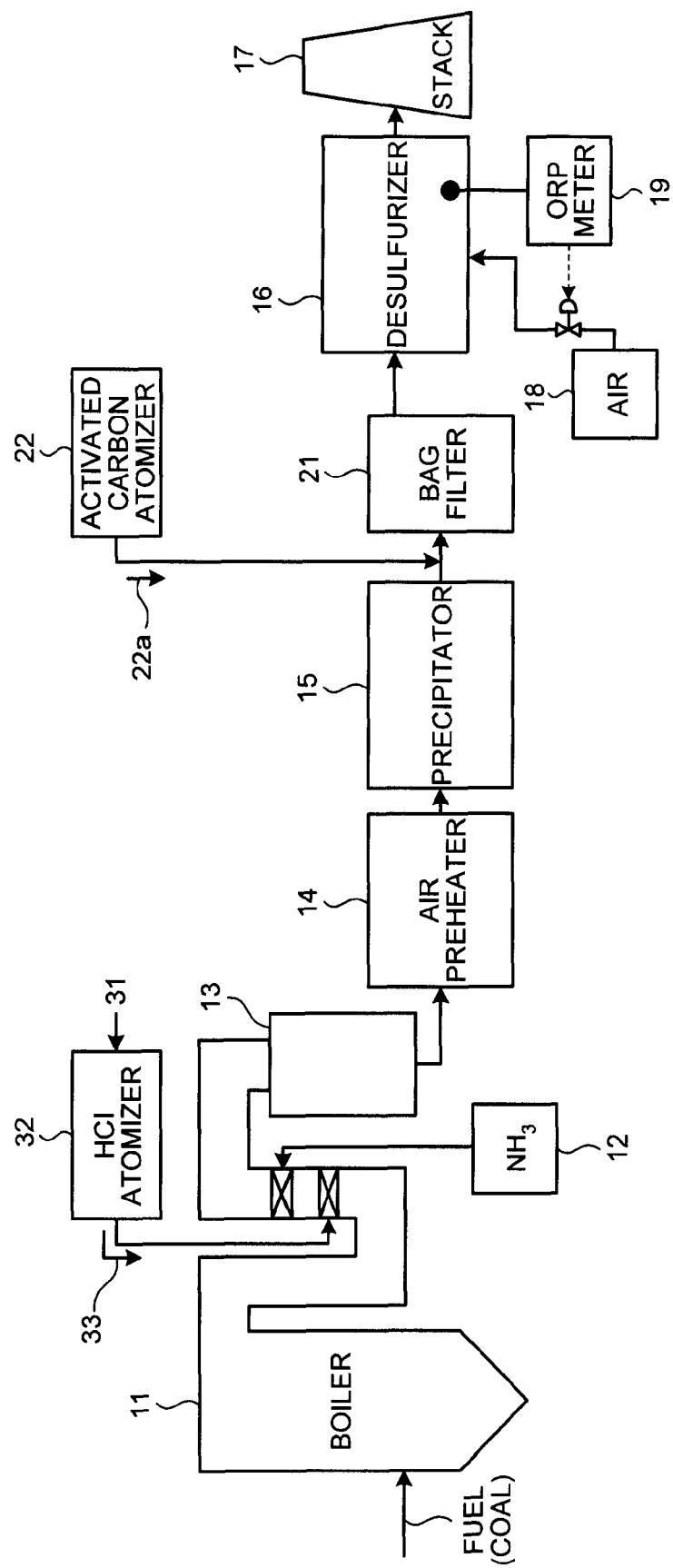
FIG. 1 is a schematic diagram of a flue gas control system of a coal combustion boiler according to a first embodiment of the present invention.

EXPLANATIONS OF LETTERS OR NUMERALS 11 coal combustion boiler
12 ammonia
13 $NO_x$ removing apparatus
14 air preheater
15 precipitator
16 desulfurizer
17 stack
21 bag filter
22a activated carbon
22 activated carbon atomizer
23 supernatant water
24 gypsum
41 solid-liquid separator

BEST MODE(S) FOR CARRYING OUT THE INVENTION

Exemplary embodiments of the present invention will be explained below in detail with reference to the accompanying drawings. The present invention is not limited to the embodiments. In addition, constituent elements in the embodiments include those that can be easily assumed by those skilled in the art or that are substantially equivalent.

First Embodiment

A flue gas control system of a coal combustion boiler according to a first embodiment of the present invention is explained with reference to the drawings.

FIG. 1 is a schematic diagram of the flue gas control system of the coal combustion boiler according to the present invention.

The flue gas control system of the coal combustion boiler includes: an HCl atomizer 32 that sprays hydrogen chloride 33 to flue gas from the coal combustion boiler 11 that uses coal as a fuel F; the $NO_x$ removing apparatus 13 that removes nitrogen oxides by ammonia denitration by adding the ammonia 12 to the flue gas after spraying hydrogen chloride and oxidizes mercury; the air preheater 14 that recovers heat in the gas after removal of nitrogen oxides; the precipitator 15 that removes particulates in the gas after heat recovery; the activated carbon atomizer 22 that sprays activated carbon 22a into the gas after particulate collection; the bag filter 21 that collects activated carbon having adsorbed mercury; the desulfurizer 16 that removes sulfur oxides in the flue gas after removal of activated carbon by a limestone gypsum method using gas-liquid contact and also removes mercury oxides; the stack 17 that discharges the gas which has undergone desulfurization to outside; and an ORP meter 19 that measures an oxidation reduction potential for feeding air to a slurry absorbent in the desulfurizer 16.

The flue gas control system of the coal combustion boiler according to the present embodiment includes the HCl atomizer 32 that sprays the hydrogen chloride 33 on an upstream side of the $NO_x$ removing apparatus 13, so that the hydrogen chloride 33 is sprayed into a flue gas duct to promote oxidation of mercury ($Hg^0 \rightarrow Hg^{2+}$) on an $NO_x$ removal catalyst in the $NO_x$ removing apparatus 13.

This is because mercury oxide ($Hg^2$) is more likely to be adsorbed by activated carbon than zero-valent mercury ($Hg^0$), thereby enabling to increase the adsorbed amount of mercury (kgHg/kg activated carbon) and decrease the used amount of activated carbon (kg activated carbon).

The activated carbon having adsorbed mercury is recovered by the bag filter 21 and disposed separately.

The oxidation reduction potential (ORP) of the absorbent in the desulfurizer 16 is measured by the ORP meter 19, and a measurement value of the oxidation reduction potential is set equal to or higher than 150 millivolts.

This is because mercury oxide ($Hg^{2+}$) is absorbed by a gas absorbent (limestone, gypsum slurry) in the desulfurizer 16 by gas-liquid contact, and at this time, reduction ($Hg^{2+} \rightarrow Hg_0$) of the absorbed mercury oxide ($Hg^{2+}$) can be suppressed by adjusting an ORP value to equal to or higher than 150 millivolts, more preferably to 200 to 300 millivolts.

Accordingly, it can be prevented that mercury is released again into the gas from the gas absorbent.

Also in a flue gas control system having the existing activated carbon atomizer, mercury adsorption efficiency can be improved by installing a hydrogen chloride feeding device that feeds hydrogen chloride on an upstream side of the desulfurizer and the ORP meter of the gas absorbent in the desulfurizer to reduce the used amount of activated carbon. Accordingly, the spray amount of the activated carbon can be reduced in a long term by a simple facility change. As a result, the amount of the activated carbon to be disposed can be decreased, thereby enabling to promote considerable reduction of operating costs of the flue gas control system.

While the bag filter 21 is installed in the present embodiment, the activated carbon can be directly introduced into the desulfurizer 16 without installing the bag filter 21, and can be discharged simultaneously at the time of removing gypsum from the absorbent according to the limestone gypsum method.

Further, according to the charcoal type of the coal, when a molar ratio of mercury (Hg)/sulfur (S) is equal to or higher than $1.3 \times 10^{-6}$, an operating method of the flue gas control system of the coal combustion boiler can be taken such that mercury concentration is monitored on a downstream side of a desulfurizer, and the activated carbon 22 is forcibly sprayed according to the monitoring result.

Normally, in the coal having a small content of mercury, when the molar ratio of mercury (Hg)/sulfur (S) (hereinafter, "Hg/S molar ratio") is equal to or lower than $1.3\times10^{-6}$, mercury in the flue gas can be removed only by feeding of the hydrogen chloride 33 and controlling of the ORP meter. However, when the charcoal type of the coal changes and the Hg/S molar ratio abruptly changes to be equal to or higher than $1.3\times10^{-6}$, mercury cannot be removed quickly only by controlling the ORP meter 19.

In such a case, the mercury concentration in the flue gas increases while controlling of the ORP meter 19 is stabilized, and thus scattering of mercury to outside can be temporarily prevented by forcibly spraying the activated carbon.

This is because when the mercury (Hg)/sulfur (S) molar ratio in coal is equal to or higher than $1.3\times10^{-6}$ (molHg/molS), a generation rate of gypsum ($CaSO_4$) is insufficient with respect to a removal rate of mercury (Hg).

The reason why the Hg/S molar ratio is specified as $1.3\times10^{-6}$ is explained next.

Figure 2:
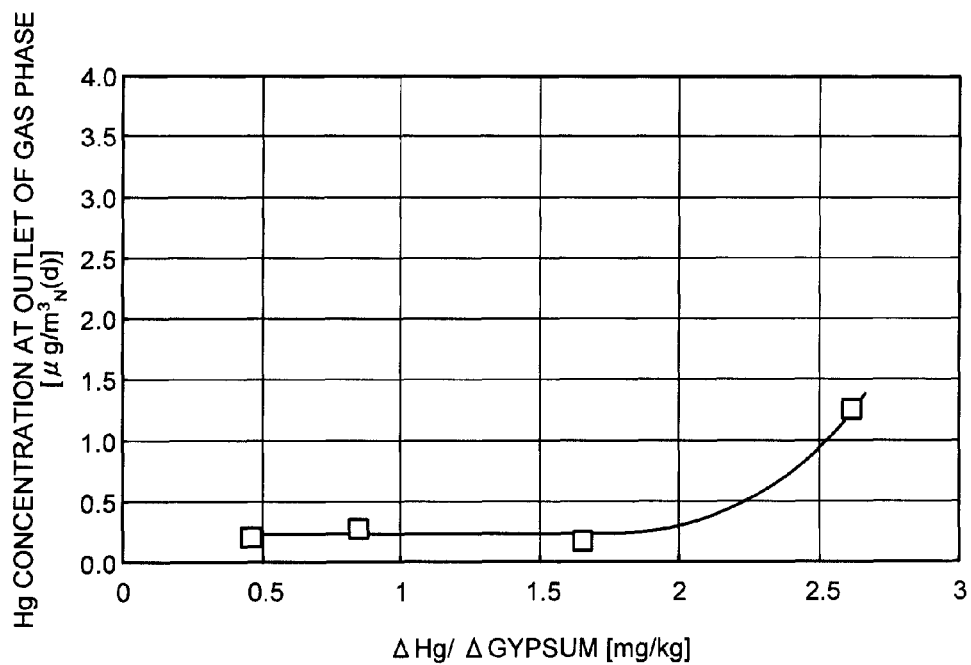
FIG. 2 depicts a relationship between $\Delta Hg/\Delta CaSO_4$ and mercury removal efficiency in a gas-liquid contact column (mercury concentration in gas at an outlet of the gas-liquid contact column).

First, a relationship between $\Delta Hg/\Delta CaSO_4$ and mercury removal efficiency in a gas-liquid contact column, which is the desulfurizer 16, (mercury concentration in the gas at an outlet of the gas-liquid contact column) is shown in FIG. 2, based on a relationship of $\Delta Hg/\Delta CaSO_4 = \Delta$ mercury removal amount/$\Delta$ gypsum generation amount.

It is seen from the graph that the mercury removal efficiency can be maintained in a range in which $\Delta Hg/\Delta CaSO_4$ is equal to or less than 2 mgHg/kgCaSO$_4$.

Sulfur (S) contained in mercury (Hg) and gypsum ($CaSO_4$) arises from coal on the uppermost stream side.

When $\Delta Hg/\Delta CaSO_4 = 2$ mgHg/kgCaSO$_4$ is converted, the following result is obtained.

Hgmol/Smol=2 mgHg/kgCaSO$_4 \times$[(1/200.59)$\times 10^{-3}$ molHg/mgHg]/(1/136.144)$\times 10^3$ molS/kgCaSO$_4$]=1.357$\times 10^{-6}$ molHg/molS It is assumed that the molecular weight of mercury (Hg) is 200.59, the molecular weight of sulfur is 32.066, and the molecular weight of gypsum ($CaSO_4$) is 136.144.

Therefore, $\Delta Hg/\Delta CaSO_4$ 2 mgHg/kgCaSO$_4$ corresponds to $1.36\times10^{-6}$ molHg/molS.

As a result, $1.3\times10^{-6}$ is specified as a threshold of the Hg/S molar ratio, and when this is exceeded, it means that the mercury removal efficiency deteriorates. Therefore, a mercury removal measure needs to be taken.

Figure 3:
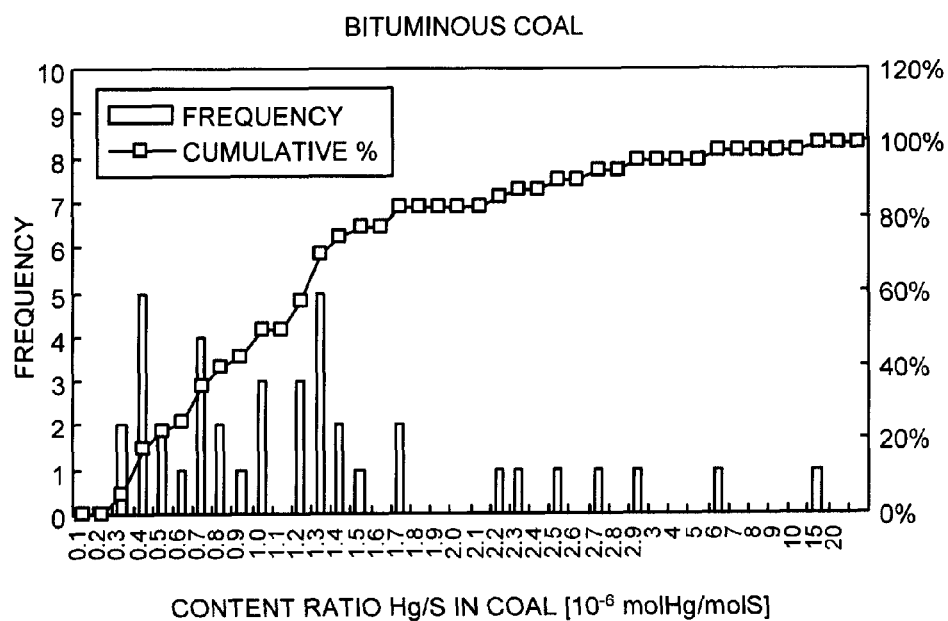
FIG. 3 depicts aggregation results of Hg/S ratio of 30 specimens for bituminous coal of the American coal.
Figure 4:
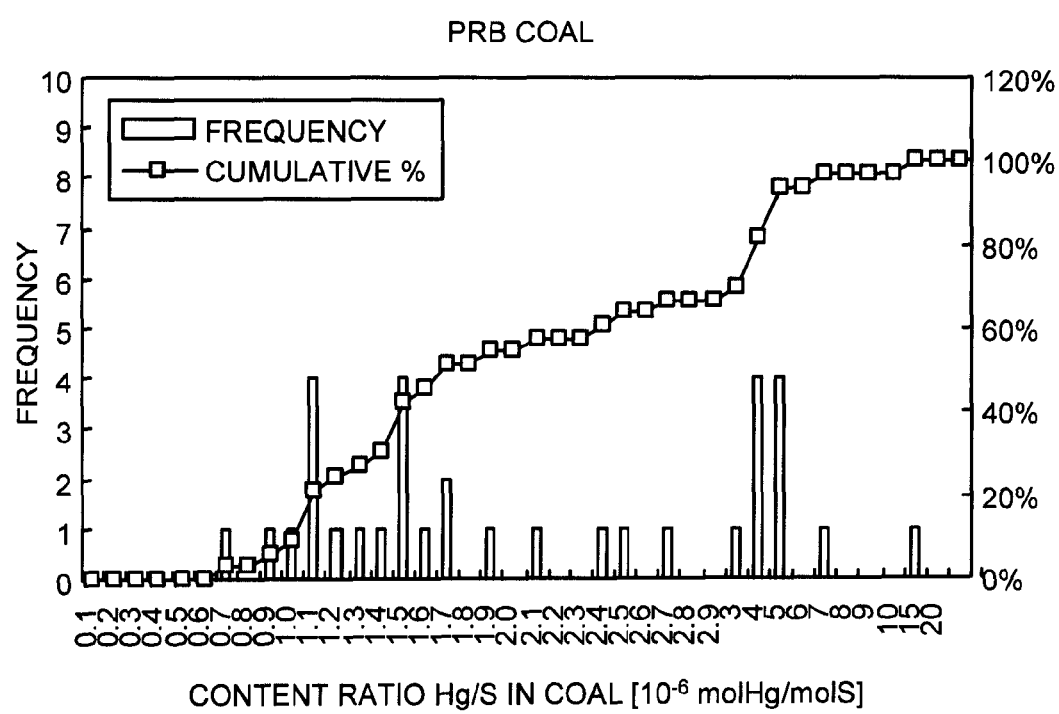
FIG. 4 depicts aggregation results of Hg/S ratio of 30 specimens for PRB coal of the American coal.

Relationship diagrams between a content ratio (Hg/S) and frequency of coal in bituminous coal and PRB coal are shown in FIGS. 3 and 4.

FIGS. 3 and 4 depict aggregation results of Hg/S ratio of 30 specimens, respectively, for bituminous coal and PRB coal of the American coal. The ratio of being equal to or less than $1.36\times10^{-6}$ molHg/molS was about 70% in bituminous coal and about 27% in PRB coal.

Even in the case that the bituminous coal is used independently or in combination, mercury removal can be efficiently performed by feeding hydrogen chloride and controlling the ORP. Also in a case that the type of coal changes, it is possible to handle it by spraying the activated carbon, even if there is an abrupt rise in the mercury concentration.

Second Embodiment

Figure 5:
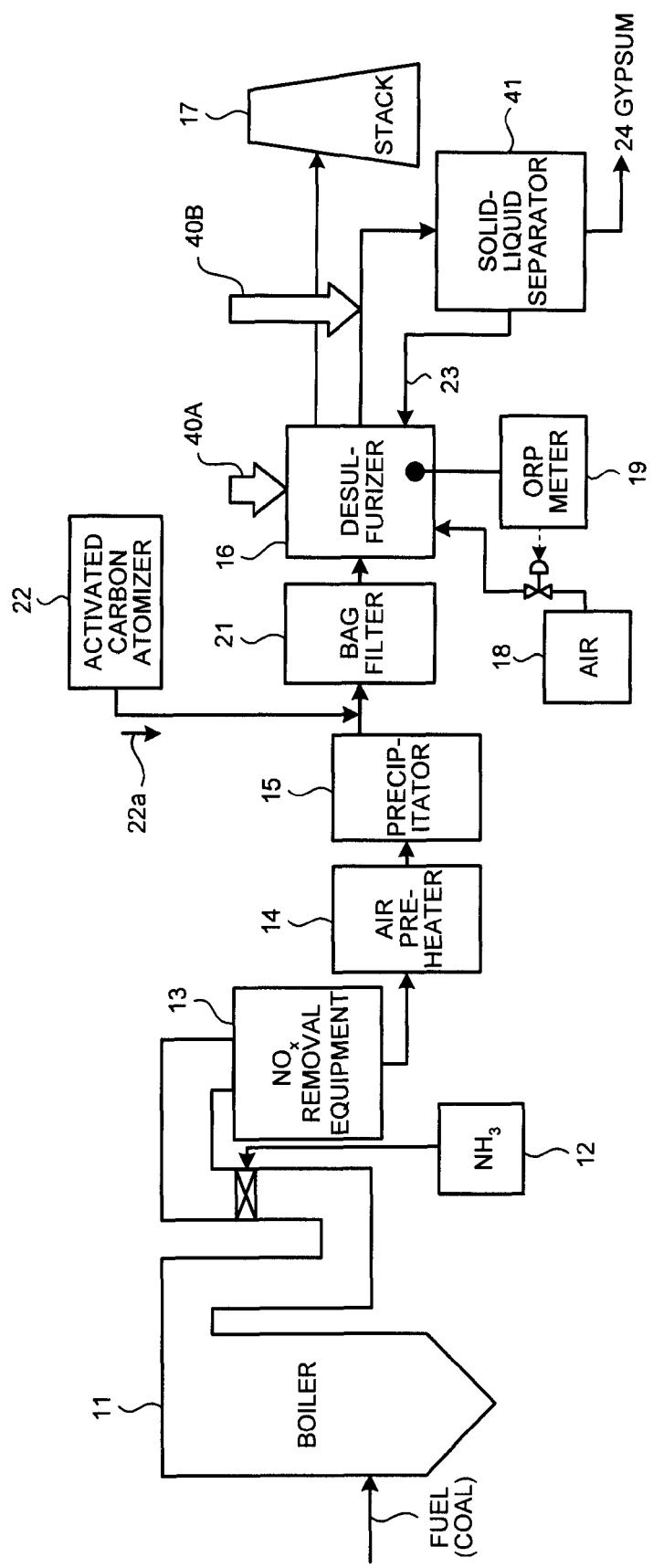
FIG. 5 is a schematic diagram of a flue gas control system of a coal combustion boiler according to a second embodiment of the present invention.

FIG. 5 is a schematic diagram of another flue gas control system of a coal combustion boiler according to the present invention.

The flue gas control system in this embodiment includes: the NO$_x$ removing apparatus 13 that removes nitrogen oxides in flue gas from the coal combustion boiler 11 by adding the ammonia 12 to the flue gas; the air preheater 14 that recovers heat in the gas after removal of nitrogen oxides; the precipitator 15 that removes particulates in the gas after heat recovery; the gas-liquid contact type desulfurizer 16 that removes sulfur oxides in the gas after particulate collection by a limestone gypsum method and also removes mercury oxides; and the stack 17 that discharges purged gas which has undergone desulfurization and mercury removal to outside. In this flue gas control system, a slurry absorbent containing mercury from the desulfurizer 16 is extracted to outside, a flocculant is added thereto before separating gypsum, thereby flocculating and removing mercury.

That is, as shown in FIG. 5, the flocculant is added to the slurry absorbent containing mercury extracted from the desulfurizer 16 to flocculate mercury in the flocculant. When gypsum 24 is separated and removed by a solid-liquid separator 41, the flocculant is also separated together with the gypsum 24, to reduce the mercury concentration in separated water.

Addition of the flocculant can be performed inside (40A) of the desulfurizer 16 or on an upstream side (40B) of the solid-liquid separator 41.

As a result, the concentration of zero-valent mercury Hg$^0$) in the separated water to be returned to the desulfurizer 16 can be reduced, thereby enabling to prevent re-scattering of mercury in the desulfurizer 16.

Third Embodiment

Figure 6:
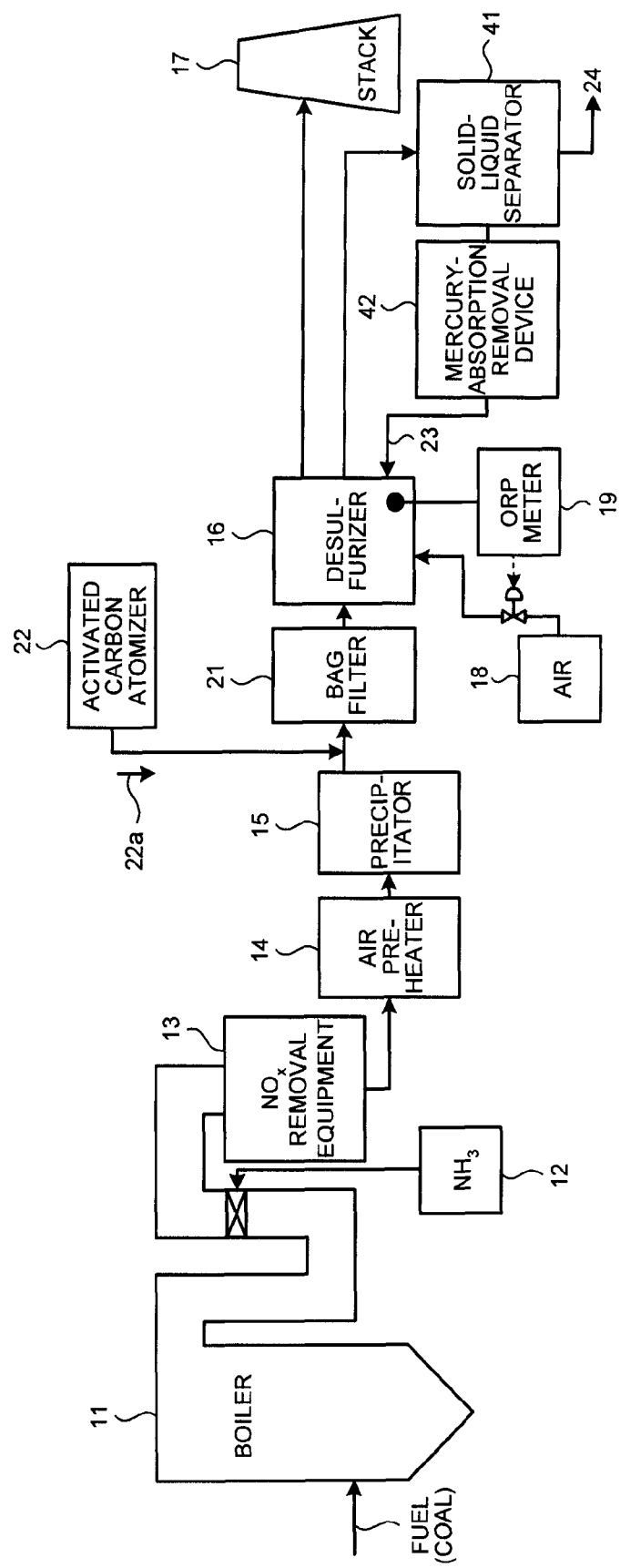
FIG. 6 is a schematic diagram of a flue gas control system of a coal combustion boiler according to a third embodiment of the present invention.
Figure 7:
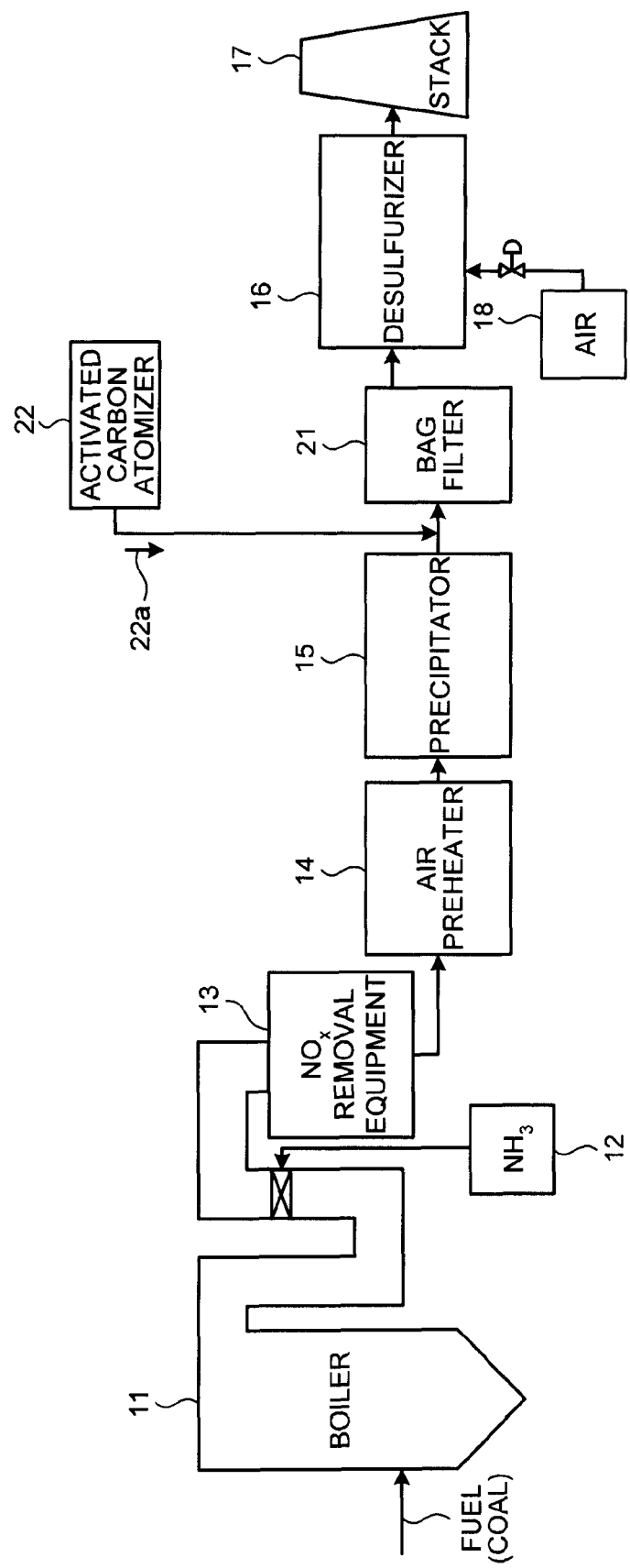
FIG. 7 is a schematic diagram of a flue gas control system of a conventional coal combustion boiler.

FIG. 6 is a schematic diagram of another flue gas control system of a coal combustion boiler according to the present invention.

The flue gas control system in this embodiment includes: the NO$_x$ removing apparatus 13 that removes nitrogen oxides in flue gas from the coal combustion boiler 11 by adding the ammonia 12 to the flue gas; the air preheater 14 that recovers heat in the gas after removal of nitrogen oxides; the precipitator 15 that removes particulates in the gas after heat recovery; the gas-liquid contact type desulfurizer 16 that removes sulfur oxides in the gas after particulate collection by the limestone gypsum method and also removes mercury oxides; and the stack 17 that discharges purged gas which has undergone desulfurization and mercury removal to outside. In this flue gas control system, a slurry absorbent containing mercury from the desulfurizer 16 is extracted to outside, the gypsum 24 is separated by the solid-liquid separator 41, supernatant water 23 after removal of the gypsum 24 is brought into contact with a mercury adsorbent such as activated carbon, a chelating resin, an ion exchange resin, or a sulfide-supporting carrier in a mercury-adsorption removing apparatus 42, thereby adsorbing and removing mercury.

As a result, the concentration of zero-valent mercury (Hg$^0$) in the separated water to be returned to the desulfurizer 16 can be reduced, thereby enabling to prevent re-scattering of mercury in the desulfurizer 16.

The present embodiment can be combined with the flocculant addition in the second embodiment shown in FIG. 5 so as to further improve the mercury removal effect.

INDUSTRIAL APPLICABILITY

According to the flue gas control system and the operating method thereof according to the present invention, because re-scattering of mercury is suppressed, the mercury removal efficiency can be improved, and thus the flue gas control system and the operating method thereof are suitable for flue gas control when the mercury emission amount in flue gas is regulated.

The invention claimed is:

1. A flue gas control system of a coal combustion boiler comprising:
NO$_x$ removing apparatus that removes nitrogen oxides in flue gas from a coal combustion boiler;
an air preheater that recovers heat in gas after removal of nitrogen oxides;
a precipitator that removes particulates in gas after heat recovery;
a gas-liquid contact type desulfurizer that removes sulfur oxides in gas after particulate collection by a limestone gypsum method and also removes mercury oxides; and
a stack that discharges gas which has undergone desulfurization to outside, wherein hydrogen chloride is sprayed on an upstream side of the desulfurizer, and activated carbon is sprayed on a downstream side of the precipitator to adsorb mercury in gas.

2. A flue gas control system of a coal combustion boiler comprising:
NO$_x$ removing apparatus that removes nitrogen oxides in flue gas from a coal combustion boiler;
an air preheater that recovers heat in gas after removal of nitrogen oxides;
a precipitator that removes particulates in gas after heat recovery;
a gas-liquid contact type desulfurizer that removes sulfur oxides in gas after particulate collection by a limestone gypsum method and also removes mercury oxides; and
a stack that discharges gas which has undergone desulfurization to outside, wherein
hydrogen chloride is sprayed on an upstream side of the desulfurizer,
activated carbon is sprayed on a downstream side of the precipitator to adsorb mercury in gas, and
an oxidation reduction potential of an absorbent in the desulfurizer is set to equal to or higher than 150 millivolts.

3. The flue gas control system of a coal combustion boiler according to claim 1, wherein
a slurry absorbent containing mercury is extracted to outside, and a flocculant is added thereto before separating gypsum to flocculate and remove the mercury.

4. The flue gas control system of a coal combustion boiler according to claim 1, wherein
a separate liquid in which gypsum is separated is brought into contact with at least one of activated carbon, a chelating resin, an ion exchange resin, and a sulfide-supporting carrier to adsorb and remove mercury.

5. An operating method of a flue gas control system of a coal combustion boiler, wherein
the flue gas control system of a coal combustion boiler according to claim 1 is used, and
when a molar ratio of mercury (Hg)/sulfur (S) in coal is equal to or higher than $1.3 \times 10^{-6}$, mercury concentration is monitored on a downstream side of a desulfurizer, and activated carbon is sprayed according to a monitoring result.

* * * * *